United States Patent [19]

Shen

[11] Patent Number: 5,171,446
[45] Date of Patent: Dec. 15, 1992

[54] POLLUTANT EMISSION CONTROL SYSTEM

[76] Inventor: Hsin-Der Shen, 208 Min-Shen W. Rd., Taipei, Taiwan

[21] Appl. No.: 641,645

[22] Filed: Jan. 15, 1991

[51] Int. Cl.⁵ ............................................. B01D 45/12
[52] U.S. Cl. .................................. 210/512.3; 55/237; 55/260; 55/401
[58] Field of Search ................... 55/400, 401, 406, 413, 55/414, 68, 69, 73, 223, 227, 244, 248, 250, 252, 253, 257.2, 259, 237, 260; 210/512.3

[56] References Cited

U.S. PATENT DOCUMENTS

| | | | |
|---|---|---|---|
| 2,233,520 | 3/1941 | de Vigan | 55/401 |
| 3,563,004 | 2/1971 | Schouw | 55/237 |
| 3,608,280 | 9/1971 | Martin | 55/260 |
| 3,653,187 | 4/1972 | Petersen | 55/237 |
| 3,842,461 | 10/1974 | Wurster | 55/260 |
| 4,285,704 | 8/1981 | Zuzanov et al. | 55/401 |
| 4,922,691 | 5/1990 | Shen | 55/400 |
| 4,936,879 | 6/1990 | Priestley, Jr. | 55/400 |

Primary Examiner—Robert A. Dawson
Assistant Examiner—W. L. Millard

[57] ABSTRACT

A pollutant emission control system including a centrifugal separator having blades capable of causing sufficient centrifugal force to remove large pollutant particles, and a pressurized deposit container including an annular container with cleaning fluid serving as a vaporizing passageway, permitting gaseous pollutants to mix with a liquid cleaning agent by means of turbulence and Henry's law generated in said annual container with the result that polluted particles deposited in the cleaning liquid, and liquid membranes having a porous sponge body with a high density of pockets capable of further filtering the pollutant particles in the vaporized emission, and, finally a demisting device with a humidity/odor removing system having an activated carbon sponge bag used to further remove fine pollutant and odorous particles.

6 Claims, 3 Drawing Sheets

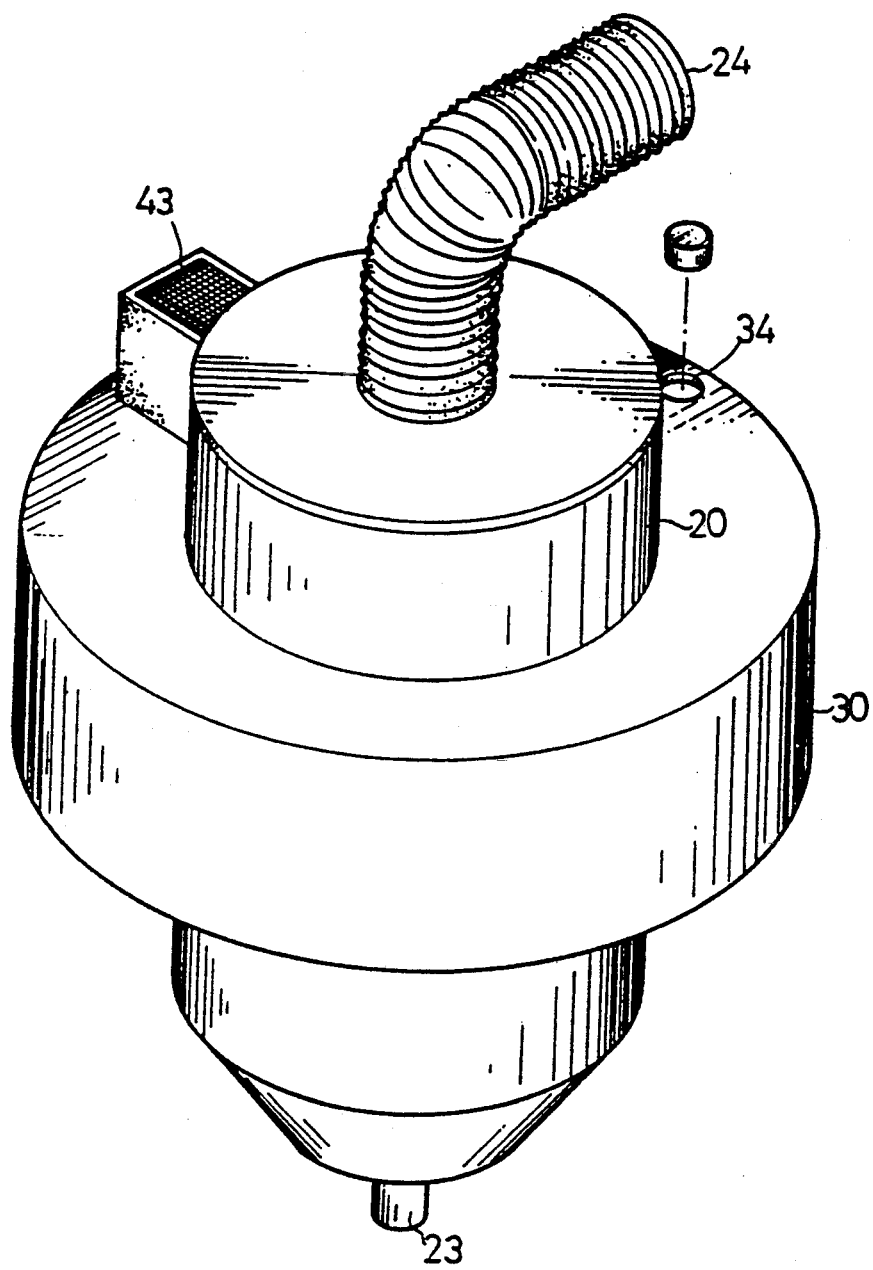
FIG FIG 3

POLLUTANT EMISSION CONTROL SYSTEM

FIELD OF THE INVENTION

The present invention relates to a pollutant emission filtering process and, more specifically, to a pollutant emission control system.

BACKGROUND OF THE INVENTION

Owing to the advancement of industry and technology, the quality of human life has been greatly enhanced. Yet, at the same time, the environment has become badly polluted during this process of advancement. Among these various environmental problems which have arisen, air pollution has become one of the most serious problems. Several particular particles in the air, such as organic components, NOx, SOx, CO, and even smoke and odors have been proven to be harmful to plants, animals, humans, property and the general quality of life.

It has been verified in recent years that polluting emissions discharged from factories and automobiles, or fumes or smoke produced in the chemical, pharmaceutical and surface coating industries, can cause diseases such as lung cancer, emphysema and asthma. Moreover, such polluting particles also often cause slow poisoning, headaches, insomnia, eyeaches, etc.

As a result, great efforts are being made by governments and private industry both to prevent air pollution, and a great deal of equipment has been specifically developed in recent years to remove such polluting particles from the air. For example, settling chambers, commonly used to remove very large airborne particles; cyclone collectors, widely used to remove medium size particles; bag filters, used to collect dust; wet collectors, for eliminating large sized particles; electrostatic precipitators, for removing microparticles; incineration, for removing gas pollutants; absorption applications, using materials such as activated carbon to catch pollutants; and gas-scrubbers, used to clean gaseous type pollution. However, with respect to extremely fine dust and suspended solids in the air, such as fumes, cigarette smoke composed of nicotine, tar and ammonia, no effective and economic method has yet been developed to remove such pollutant particles scattered in the air.

SUMMARY OF THE INVENTION

This invention relates to an emission pollution air treatment apparatus and, more particularly, to an apparatus for providing a pollutant emission control system including a centrifugal separator, pressurized deposit container, liquid membranes and a demisting device, used in conjunction to clean the air.

The main technique of this invention involves centrifugal separation, which works by passing large amounts of such polluting emissions through a centrifugal separator having blades capable of separating large pollutant particles from gaseous type emissions.

Another technique of this invention is that, after such large pollutant particles are separated out by centrifugal force, the remaining emissions then passed into a pressurized deposit container. The left over gaseous emissions then pass though an annular container with cleaning fluid and, thus, become vaporized. Said annular container with cleaning fluid serves as a vaporizing passageway to increase aerodynamic interaction between the liquid and gas phases. Several turbulent flow slabs are installed in the annular container to increase the residence time of liquid/air mixing.

Still another technique is that, after the pressurized deposit and vaporization process, such vaporized elements are then filtered through a series of liquid membranes. A porous sponge body with a high density of pockets is used as a type of liquid membrane filter. Such a liquid membrane function is formed by the pockets of the porous sponge body and comes into effect as a filter when vaporized air passes through. The smaller pollutant particles, after passing through the annular container with a liquid cleaning agent, are vaporized, and are then filtered out when they pass through the liquid membranes. At the same time, emulsification, neutralization and other chemical reactions will occur by means of the liquid cleaning agent medium. When the small pollutants are accumulated to a certain level, they will drop down by their own weight.

Yet another technique of this invention is that, after passage through the liquid membrane filter sponge, the remaining elements then pass into a demisting device. The demisting device contains a humidity/odor removing system which has an activated carbon sponge bag used to further remove any leftover fine pollutant particles and, thus, clean fresh air is finally omitted through a top vent.

BRIEF DESCRIPTION OF THE DRAWINGS

FIG. 3 is a assembled perspective view thereof.

DETAILED DESCRIPTION OF THE INVENTION

Figure 1:
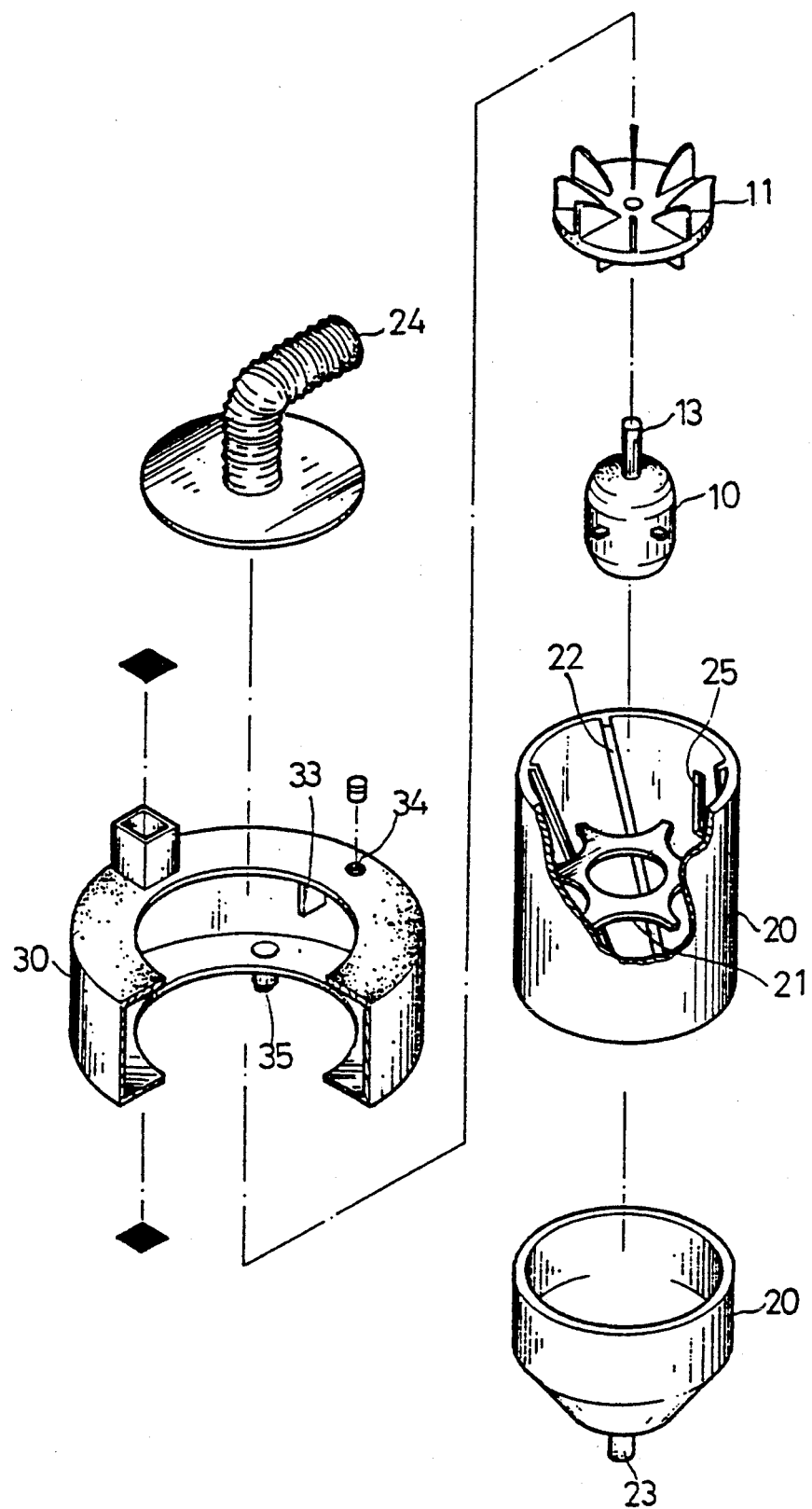
FIG. 1 is an exploded perspective view of this invention.
Figure 2:
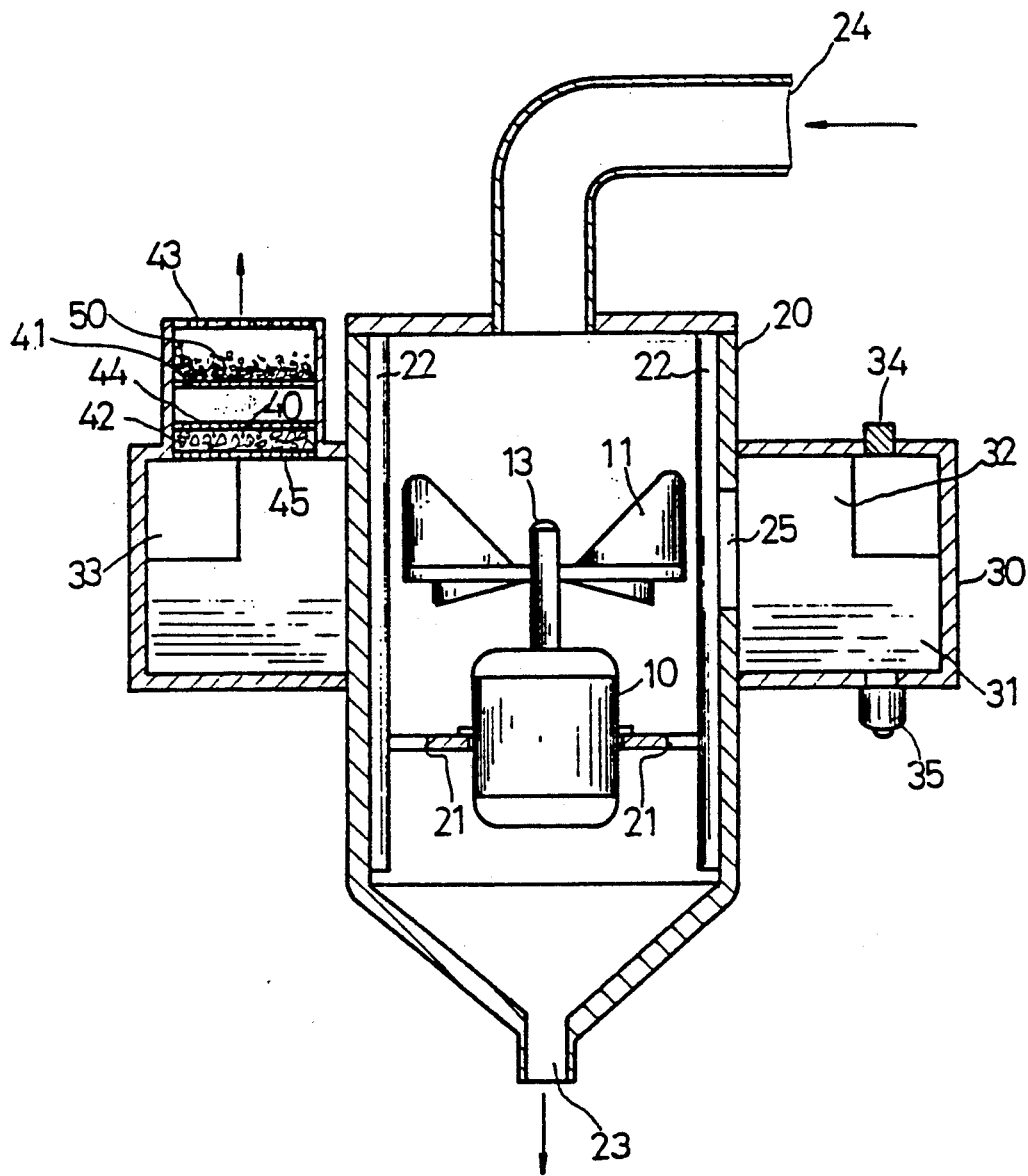
FIG. 2 is a assembled sectional view thereof.

Please refer to FIGS. 1 to 3 The present pollutant emission control system is utilized for the purpose of removing polluting components produced by combustion or in the manufacturing process. A motor 10 is used to drive centrifugal blades 11 so that pollutant emissions are rapidly sucked into an inlet 24 and enter into a cylinder 20. The motor 10 is mounted on a support member 21 with its drive shaft 13 protruding beyond the support member 21 to connect with the blades 11. Air containing said pollutants enters the cylinder 20 and the centrifugal blades causes a strong turbulent vortex. On the inner surface of the cylinder 20 are arranged arch stopper members 22 with a rotary direction contrary to that of the blades 11 placed in a manner so that the bigger particles in the emission will deposit onto the arch stopper members 22 due to centrifugal force and, after impact with the arch stopper members 22, drop down an outlet 23 of the cylinder 20 and are collected in a collector (not shown). For example, tar droplets in a fume could flow down along the arch stopper members 22 toward the outlet 23 to be discharged.

In the second phase of filtration, the emission, now without bigger particles, then goes through a longitudinal slot 25 between the arch stopper members 22 and flows into a pressurized annular container 30 containing cleaning fluid. The annular container is formed on the outer surface of the cylinder 20. The annular container 30 is half filled with cleaning fluid 31 so that the upper half portion of the container 30 serves as vaporizing passageway 32, whereby the gaseous pollutants mix with the surface molecules of the liquid to form an air/liquid mixture. This pressurized air/liquid mixture flows around the vaporizing passageway 32. In the vaporizing passageway 32 are arranged disposed several flow slabs 33, which create turbulence, thereby increasing the residence time of vaporization process. According to Henry's law, the solubility of gaseous pollutants in a liquid solution will be proportional to vapor pressure. The result of this flow through the vaporizing passageway 32 is that the gaseous pollutants are now soluble in the cleaning fluid 31. A liquid inlet 34 and a liquid drain 35 are respectively disposed on the top portion and bottom portion of the annual container 30 for refilling the container with new cleaning liquid to keep the liquid at a constant level and draining deposits when the liquid is dirty.

In the third phase of filtration, the vaporizing passageway 32 outlets into a porous sponge body 40 which has a high density of pockets 42. This sponge is placed between two fine filtering screens 44, and 45. When the air/liquid mixture passes through the porous sponge body 40, a type of liquid membranes is formed by the pockets 42 so that the pollutant particles in the gaseous vapor will be filtered by these liquid membranes. Moreover, emulsification, neutralization or chemical reaction of the liquid cleaning agent medium will occur in the gaseous vapor. Subsequently, the pollutant particles can not pass the liquid membranes and will coalesce with liquid molecules, then drop down into the annular container 30 due to their own weight. The pollutant particles will then be deposited in the cleaning fluid 31. As a result, the clean emissions will emerge and fresh air is rapidly discharged through the porous sponge body 40. In addition, it should be pointed out that a cleaning agent can be added to the cleaning fluid 31 to emulsify any small oil droplets. Also any foul smelling material will be diluted by the liquid cleaning agent to reduce the bad odor. For example, for the harmful components in cigarette smoke, such as tar and nicotine, different cleaning agents can be added to the cleaning fluid 31 for eliminating this type of pollutants. Moreover, acid gas or alkaline gas can be easily neutralized and stabilized by an alkaline or an acid liquid to produce cleaner, safer air.

The air passing through the porous sponge body 40 will further go through a deminting device which is made of activated carbon sponge bags 50 (or silicone or other humidity-absoring materials), and finer particles in the air will be filtered from the air by the fine filtering screen 41, with the result that clean air is discharged from a discharging outlet 43 and over 90% of the pollutants and odorous material removed.

I claim:

1. A pollutant emission control system comprising:
   a centrifugal separator including a cylinder, a support member mounted in said cylinder, a motor mounted on said support member, and blades driven by said motor;
   said cylinder having an upper inlet and a lower outlet, and a longitudinal slot midway between said upper inlet and said lower outlet;
   arch stopper members carried interiorly on said cylinder with a rotary direction contrary to that of said blades whereby any existing polluting emission is rapidly sucked into said inlet inside of said cylinder forming a strong turbulent vortex, with the result that large, pollutant emission particles collect on said arch stopper member due to gravitational and centrifugal forces so as to be discharged from said outlet due to their own weight;
   a pressurized deposit container including an annual container having an upper half portion with a plurality of slab members arranged on said upper half portion of said annular container;
   said annular lower half portion container being filled with cleaning fluid medium and said upper half portion thereof serving as a vaporizing passageway with the result that pollutant emissions free of large pollutant particles can go through said cylinder longitudinal slot and enter said vaporizing passageway to form a liquid/air mixture;
   liquid filter membranes including at least two fine filtering screens and a porous sponge body therebetween;
   said porous sponge body contains a high density of pockets so that when said liquid/air mixture passes through, the pollutant particles will be trapped by said liquid membranes and due to chemical reaction of the liquid medium in said air/liquid mixture, said trapped pollutant particles and cleaning liquid molecules deposit back into said fluid medium due to their own weight, and the pollutant particles are deposited in said cleaning fluid medium with the result that the polluted air is cleaned from odor thereby the fresh air is rapidly discharged through said porous sponge body of each of said membranes; and
   a demisting device having a discharging outlet comprised of a humid/odor removing system including an activated carbon sponge bag whereby the gas discharged from said porous sponge body further goes through said activated carbon sponge bag for filtering additional finer pollutant and odorous particles from the air, with the result that the fresh air is then discharged from said discharging outlet.

2. A pollutant emission control system of claim 1, wherein said demisting device further includes a timidity-absorbing means formed from silicone material.

3. A pollutant emission control system of claim 2, wherein said annular container further has an liquid inlet and a liquid drain for refilling new liquid cleaning agent and draining the deposit.

4. A pollutant emission control system of claim 3, wherein said annular container further has multiple curved or waved portions.

5. A pollutant emission control system of claim 4, wherein said liquid membranes further can replace asymmetric membranes and thin film composite membranes.

6. A pollutant emission control system o claim 5, wherein the pollutant emissions removed first by said centrifugal separator, then by said pressurized deposit container, then by said liquid membranes and finally by said demisting device.

* * * * *